United States Patent [19]

Mayer

[11] Patent Number: 4,936,341

[45] Date of Patent: Jun. 26, 1990

[54] PRESSURE REGULATOR

[75] Inventor: Wolfgang Mayer, Esslingen, Fed. Rep. of Germany

[73] Assignee: J. Eberspächer, Esslingen, Fed. Rep. of Germany

[21] Appl. No.: 314,569

[22] Filed: Feb. 23, 1989

[30] Foreign Application Priority Data

Mar. 12, 1988 [DE] Fed. Rep. of Germany ....... 3808397

[51] Int. Cl.[5] ............................................ G05D 16/08
[52] U.S. Cl. ......................... 137/505.46; 237/12.3 C; 251/238
[58] Field of Search ................. 137/505.46, 505.47; 237/12.3 C; 251/238

[56] References Cited

U.S. PATENT DOCUMENTS

| 436,235 | 9/1890 | Griffin | 137/505.47 X |
| 1,630,408 | 5/1927 | Rosenthal | 137/505.46 |
| 1,746,738 | 2/1930 | Pickering et al. | 251/238 X |
| 2,263,611 | 11/1941 | Carnes | 137/505.46 X |
| 3,072,176 | 1/1963 | Sunday | 237/12.3 C |
| 3,098,499 | 7/1963 | Schwerter | 137/505.46 X |

FOREIGN PATENT DOCUMENTS

| 3025283 | 2/1982 | Fed. Rep. of Germany | 237/12.3 C |
| 694809 | 12/1930 | France | 137/505.47 |
| 557460 | 2/1957 | Italy | 137/505.46 |

Primary Examiner—Stephen M. Hepperle
Attorney, Agent, or Firm—McGlew & Tuttle

[57] ABSTRACT

A pressure regulator for independent automobile heater fuel lines, particularly for connection upstream of a dosing pump. The pressure regulator includes an upper housing portion, and a lower housing portion which are connected together with a diaphragm being disposed between the upper housing portion and the lower housing portion. The diaphragm operates with the upper housing portion to form an air space and cooperates with the lower housing portion to define a pressure regulation space. An adjusting lever is positioned within the pressure regulation space attached to an adjusting piece which in turn is attached to the diaphragm. An inlet is provided opening into the pressure regulation space and an outlet is provided leading to a dosing pump or the like. A control member is positioned within the inlet having a sealing ring about it. The control member has a cylindrical shaft portion which is slightly smaller than a boring in the inlet connection. The cone-shaped pressure piece is positioned at the end of the control body contacting the lever. The movement of the lever causes the restriction of the inlet in response to movement of the diaphragm.

5 Claims, 2 Drawing Sheets

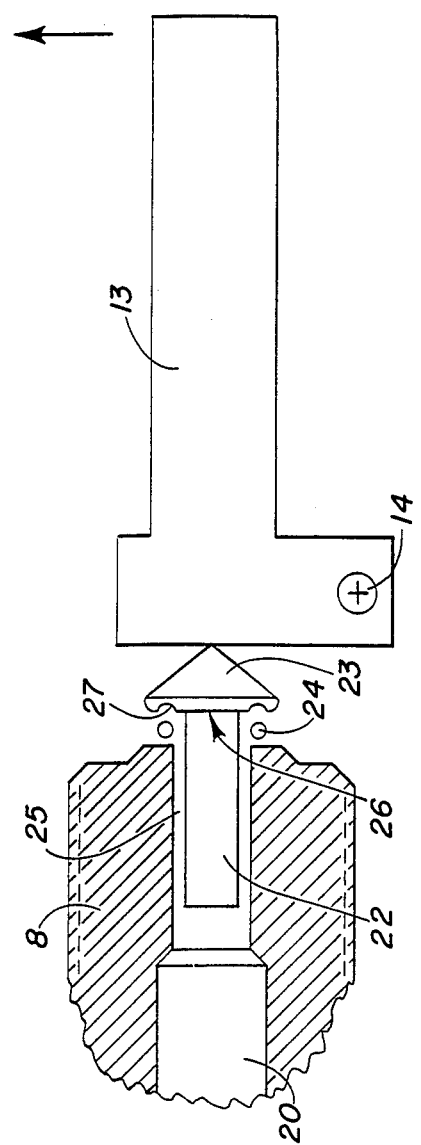

PRESSURE REGULATOR

FIELD OF THE INVENTION

This invention is concerned with a pressure regulator with a housing divided into two parts. An intermediate diaphragm and a nominal value spring are positioned in the upper part of the housing and an adjusting lever is positioned in the lower part of the housing. An adjusting piece acts on the adjusting lever. The adjusting piece transfers the movements of the diaphragm to the adjusting lever. An inlet connection and a discharge pipe are also provided with the inlet connection having a reduced boring.

BACKGROUND OF THE INVENTION

Such pressure regulators are preferably used in vehicle heaters driven with liquid fluid, independent of the engine. Such pressure regulators serve as a power supply unit for the dosing pump by which the liquid fuel, gasoline or diesel fuel, is fed to the vehicle heater. Such heating units are very compact arrangements, which because of their low fuel requirement and their compactness are very dissimilar to home heaters. It is necessary in these heating devices that the dosing pump always uniformly feed the fuel for the heating device, independent of the supply pressure, with the dosing pump requiring a constant inlet pressure for better filling of the dosing space.

Pressure regulators of this type are known, in which the inlet connection, provided with a boring, carries a truncated cone shaped extension and in which the adjusting lever has a two part shape, with one part arranged swingably on a base plate and the other part being in the form of an axially adjustable pressure pin which is engaged by the adjusting piece transferring the movement of the diaphragm. On its side facing the inlet connection, the axially adjustable pressure pin has a level sealing element which at an appropriate deflection of the adjusting lever interrupts the flow of the liquid in that it rests on the truncated cone-shaped extension of the inlet connection. However, this known pressure regulator has a number of disadvantages. It should be noted that because of the installation conditions of heating devices for vehicles, such pressure regulators can have only small dimensions. Therefore, the pressure regulators have to be adjusted with extraordinary precision, which in the known arrangements is done by screwing the pressure pin into the rotatingly arranged part, with the pressure pin carrying the seal. However, given the traffic stresses on the vehicle, this adjustment changes easily, so that the pressure regulator becomes useless. By virtue of the design, a leakage in the seal of the inlet connection also easily occurs at greater deflections of the adjusting lever and thus at increased inlet pressure, due to the seal between adjusting lever and inlet connection no longer being in the level position. This is due to the dependency of the level position of the seal on the position of the adjusting lever and therefore, when the pressure area is sloping, the leakage occurs due to uneven surface pressure. In addition, there is the danger of the inlet connection "eroding" into the seal.

SUMMARY OF THE INVENTION

The invention, therefore, has the task of exhibiting a pressure regulator of this type, which is suitable to serve as power supply unit for the dosing pump of a heating device for a vehicle heater that is independent of the engine, and which also at a greater deflection of the adjusting lever effects a secure closure of the intake and in which the seal is protected against mechanical injury. A swelling and deformation of the seal will have no effect on the tightness and operating reliability is assured at even extremely low temperatures. This problem is solved in a pressure regulator of this type by employing a control device freely movably inserted in the boring of the inlet connection, reaching up to the adjusting lever. Additionally, the control device includes a cylindrical shaft and a cone-shaped pressure piece, and by that a sealing ring is arranged between the pressure piece and the front end of the inlet connection. Thereby, an arrangement is achieved, which is easy to install, because the adjusting lever can be in one piece, and because no additional tolerances have to be observed between the inlet connection and the adjusting lever. Moreover, the advantage is obtained that the sealing areas always remain parallel, even during swelling of the sealing ring and axial adjustability is dispensable. Furthermore, tightness is assured even at extremely low temperature. This is because the seal will then merely harden, but the sealing effect is not reduced thereby. Lastly, an even surface pressure occurs, which is also independent of the position of the adjusting lever. It has proved appropriate to achieve an adjustment of the sealing ring that the jaw of the pressure piece have a groove matching the sealing ring. Since, in its outside diameter the sealing ring is smaller than the outside diameter of the control device, this groove effects a concentric seating to the cylindrical shaft of the control device. It has proved particularly appropriate for the desired use for vehicle heaters independent of the engine that the discharge pipe be shaped into a connection of the fuel dosing pump. It is achieved thereby that the pressure regulator together with the dosing pump can be stored as one unit and that a reduction of the dimensions is attained. However, according to another development of the invention, the discharge pipe can be shaped to connect an intermediate piece between the pressure regulator and a dosing pump. In this manner, a possible need to adjust to the installation conditions in a vehicle may be satisfied.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the drawings:

FIG. 2 is a considerably enlarged view of a cutaway portion, showing the control body with sealing ring in this arrangement in the inlet connection, as well as the adjusting lever.

DESCRIPTION OF THE PREFERRED EMBODIMENTS

Figure 1:
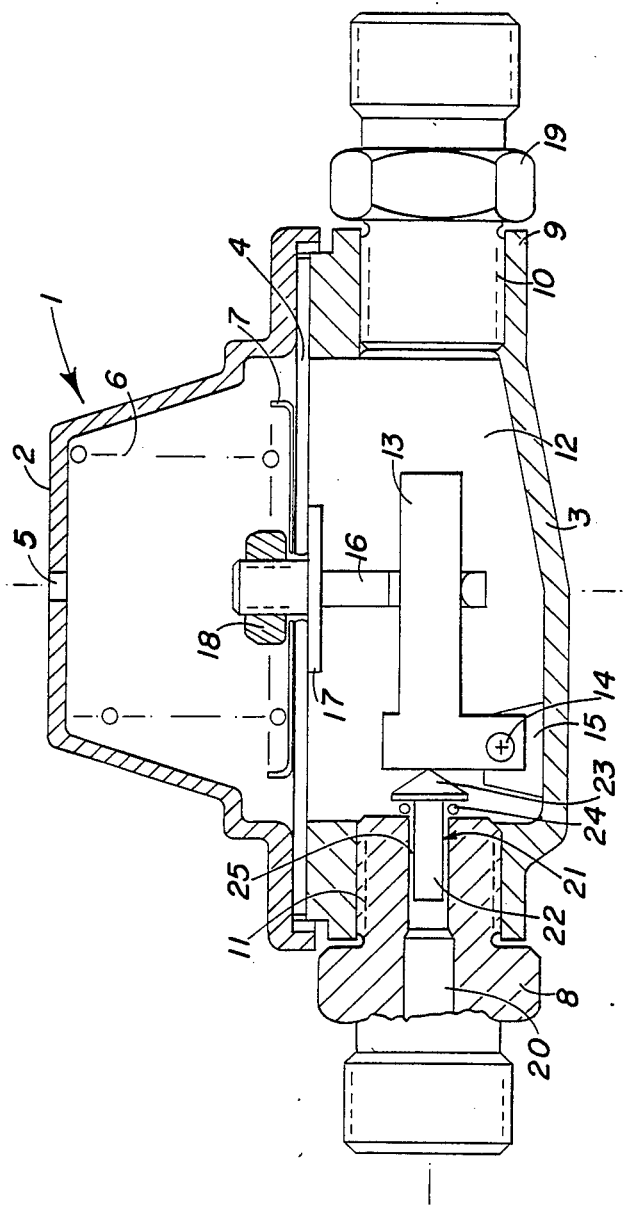
FIG. 1 is a cross-sectional view through the pressure regulator according to the invention.

As shown in FIG. 1, the pressure regulator consists of a housing 1, which is subdivided into an upper housing section 2 and a lower housing section 3, between which a diaphragm 4 is fixed. The two housing sections 2 and 3 are detachably connected to each other in a known manner. In the upper housing section 2, a vent 5 is arranged, through which excess pressure that has formed can escape. Inside the upper housing section 2 there is a spring 6 with a nominal spring force value. At one side resting the spring 6 is positioned on the housing. At the other side, the spring 6 rests on a nominal value spring washer 7 which latter rests on the diaphragm 4.

The lower housing section 3 has an inlet connection 8 and a discharge pipe 9. In the exemplified embodiment, both connection 8 and pipe 9 are inserted into the lower housing section 3 by way of proper threads 10 and respectively 11, but they can also be adjoiningly constructed. In the exemplified embodiment, a thread 10 is provided in the discharge pipe 9, to which an intermediate piece 19 can be connected. This intermediate piece 19 serves to connect the dosing pump 30 for the vehicle heater independent of the engine. However, this dosing pump can also be inserted directly into the thread 10. In the pressure regulator space 12, an adjusting lever 13 is arranged, shown in one piece in the exemplified embodiment. One of the arms of the adjusting lever 13, the shorter one, is pivoted in a fulcrum 14 on the base plate or bearing block 15. Along the longer arm of the adjusting lever 13, running in the axial direction of the pressure regulator, the adjusting lever 13 is embraced by an adjusting piece 16, so that a transmission ratio of preferably 3 to 1 will result. The adjusting piece 16 has a stop plate 17, with which it adjoins the diaphragm 4 and is held in the upper housing section 2 by a screw coupling 18, with the nut of the screw coupling 18 being tightened to the nominal value spring washer 7, so that the adjusting piece 16 transfers the movements of the diaphragm 4 to the adjusting lever 13 and can deflect the latter by fulcrum 14.

The inlet connection 8, which is connected to the lower housing section 3 by way of thread 11, has an axial boring 20 which in the end area is reduced to a smaller diameter. According to the invention, a control body 21 is inserted into this boring 20. With its cylindrical shaft the control body 21 projects into boring 20 and at its end projects into the regulator space 12. The control body 21 has a cone-shaped attachment as pressure piece 23. A sealing ring 24 is arranged between this pressure piece 23 and the front side of inlet connection 8. The cylindrical shaft 22 of the control body 21 has a smaller diameter than boring 20, so that an annular space 25 is created to the fuel supply. As can be seen in FIG. 2, the jaw 26 of the cone-shaped pressure piece 23 can have a groove 27 to hold the sealing ring 24 in position, around which latter the supplied fuel flows during operation, and which seals according to the position of the adjusting lever 13. When pressure in the regulator space 12 rises, it acts on diaphragm 4. The latter guides the adjusting lever 13 by way of adjusting piece 16 around fulcrum 14 upwards in the direction towards the diaphragm. This action produces a slanting position of adjustment lever 13 which presses the control body 21 further into the boring 20 of inlet connection 8, and sealing ring 24 is moved to the front end of inlet connection 8 and accordingly seals partially (restriction) or completely, depending on the contact pressure. In this embodiment according to the invention, the sealing ring 24 acts independently of the slanting position of adjusting lever 13 onto its entire surface, so that the sealing effect of sealing ring 24 is independent of the slanting position of adjusting lever 13, and in addition, the sealing effect is independent of an occurring swelling condition of the sealing ring or of a hardening due to lower temperatures that may occur. It has been shown that with this arrangement according to the invention, a very precise pressure control is possible, so that the filling of the dosing space of the dosing pump can be reliably assured, while on the other hand, damage to the pump due to too high inlet pressure is prevented. By the structural joining of pressure regulator and dosing pump a component reduced in size can be created, which is particularly well suited for the very tight installation dimensions of a vehicle heater.

While specific embodiments of the invention have been shown and described in detail to illustrate the application of the principles of the invention, it will be understood that the invention may be embodied otherwise without departing from such principles.

What is claimed:

1. A pressure regulator arrangement for fuel lines of independent automobile heaters, comprising:

an upper housing portion; a lower housing portion connected to said upper housing portion; a diaphragm positioned between said upper housing portion and said lower housing portion, said diaphragm cooperating with said upper housing portion to define an air space and said diaphragm cooperating with said lower housing to define a liquid fuel pressure regulation space; an adjusting lever positioned within said pressure regulation space, said adjusting lever pivotally mounted on a fulcrum mounted on said lower housing; an adjusting piece connected to said diaphragm and connected to said lever for transferring movement of said diaphragm to the adjusting lever for movement of said adjusting lever about said fulcrum; an inlet connection connected to said lower housing portion forming an inlet to said pressure regulation space, said inlet connection having a reduced boring and a front end extending into said pressure regulation space, an outlet connection connected to a fuel line upstream of a liquid fuel metering pump, said outlet connection being connected to said lower housing portion forming an outlet to said pressure regulation space, a control body freely movably inserted into said inlet connection boring so as to extend into said pressure regulation space, said control body having a cylindrical shaft with a diameter smaller than the diameter of said boring and an attached cone-shaped pressure piece having a diameter greater than the diameter of said boring, said pressure piece adapted to contact said adjusting lever; and, a sealing ring connected to said control body positioned between said pressure piece and said inlet connection front end.

2. A pressure regulator according to claim 1, wherein: said pressure piece includes a jaw portion having a groove for receiving said sealing ring.

3. A pressure regulator according to claim 1, wherein: the outlet connection forms an intermediate piece between a pressure regulator and the dosing pump.

4. A pressure regulator for fuel lines of independent automobile heaters comprising:

an upper housing portion; a lower housing portion connected to said upper housing portion; a diaphragm positioned between said upper housing portion and said lower housing portion, said diaphragm cooperating with said upper housing portion to define an air space, said adjusting lever pivotably mounted on a fulcrum mounted on said lower housing portion; an adjusting piece connected to said diaphragm and connected to said lever for transferring movement of said diaphragm to the adjusting lever for movement of said adjusting lever about said fulcrum; a washer portion connected to said diaphragm and positioned within said air space, said washer member being connected to said adjusting piece; a spring member positioned between an interior upper surface of said housing portion and said washer for stabilizing the position of said diaphragm member; an inlet connection connected to said lower housing portion forming an inlet to said pressure regulation space, said inlet connection having a reduced boring and a front end extending into said pressure regulation space, an outlet connection connected to a fuel line upstream of a liquid fuel metering pump, said outlet connection being connected to said lower housing portion forming an outlet to said pressure regulation space, a control body freely movably inserted into said inlet connection boring so as to extend into said pressure regulation space, said control body having a cylindrical shaft with a diameter smaller than the diameter of said boring and an attached cone-shaped pressure piece having a diameter greater than said boring, said pressure piece adapted to contact said adjusting lever; and, a sealing ring connected to said control body positioned between said pressure piece and said inlet connection front end.

5. A pressure regulation arrangement for independent automobile heaters comprising:

a first fuel line portion receiving liquid from a fuel supply; a second fuel line portion connected to an independent automobile heater metering pump; an upper housing portion; a lower housing portion connected to said upper housing portion; a diaphragm positioned between said upper housing portion and said lower housing portion, said diaphragm cooperating with said upper housing portion to define an air space, an adjusting lever positioned within said pressure regulation space, said adjusting lever pivotably mounted on a fulcrum mounted on said lower housing portion and said adjusting lever including a contact surface; an adjusting piece connected to said diaphragm and connected to said lever for transferring movement of said diaphragm to the adjusting lever for movement of said adjusting lever about said fulcrum and for movement of said contact surface; a spring member positioned between an interior upper surface of said housing portion and said washer for stabilizing the position of said diaphragm member; an inlet connection connected to said lower housing portion forming an inlet to said pressure regulation space, said inlet connection having a reduced boring and a front end extending into said pressure regulation space, said contact surface being movable toward and away from said front end, an outlet connection connected to a fuel line upstream of a liquid fuel metering pump, said outlet connection being connected to said lower housing portion forming an outlet to said pressure regulation space, a control body freely movably inserted into said inlet connection boring so as to extend into said pressure regulation space, said control body having a cylindrical shaft with a length less than or equal to the length of said inlet connection boring, said cylinder shaft with a diameter smaller than the diameter of said boring and an attached cone-shaped pressure piece having a diameter greater than said boring, said pressure piece; and, a sealing ring connected to said control body positioned between said pressure piece and said inlet connection front end, said cone-shaped pressure piece and said sealing ring being freely movable between said inlet connection front end and said contact surface, wherein said adjusting lever contact surface includes a substantially planar face adapted to make contact with said cone-shaped pressure piece, different portions of said surface contacting said cone-shaped pressure piece, depending upon the angular position of said lever.

* * * * *

UNITED STATES PATENT AND TRADEMARK OFFICE
CERTIFICATE OF CORRECTION

PATENT NO. : 4,936,341
DATED : June 26, 1990
INVENTOR(S) : Wolfgang Mayer, Esslingen, Fed. Rep. of Germany It is certified that error appears in the above-identified patent and that said Letters Patent is hereby corrected as shown below:

Claim 4, column 5, line 1 after "space" insert -- and said diaphragm cooperating with said lower housing to define a liquid fuel pressure regulation space; an adjusting lever positioned within said pressure regulation space --

Signed and Sealed this

Fifth Day of January, 1993

Attest:

DOUGLAS B. COMER

Attesting Officer        Acting Commissioner of Patents and Trademarks